(12) United States Patent
Ohnishi (10) Patent No.: US 10,016,939 B2
(45) Date of Patent: Jul. 10, 2018

(54) THREE-DIMENSIONAL MODELING METHOD (71) Applicant: MIMAKI ENGINEERING CO., LTD., Nagano (JP)

(72) Inventor: Masaru Ohnishi, Nagano (JP)

(73) Assignee: MIMAKI ENGINEERING CO., LTD., Nagano (JP)

( * ) Notice: Subject to any disclaimer, the term of this patent is extended or adjusted under 35 U.S.C. 154(b) by 736 days.

(21) Appl. No.: 14/542,655

(22) Filed: Nov. 16, 2014

(65) Prior Publication Data
US 2015/0142160 A1 May 21, 2015

(30) Foreign Application Priority Data
Nov. 18, 2013 (JP) ................................ 2013-238250

(51) Int. Cl.
*B29C 67/00* (2017.01)
*B33Y 10/00* (2015.01)

(52) U.S. Cl.
CPC .......... *B29C 67/0074* (2013.01); *B33Y 10/00* (2014.12)

(58) Field of Classification Search
CPC ..... B29C 67/00; B29C 67/007; B29C 67/007; B29C 67/0074; B33Y 10/00
See application file for complete search history.

(56) References Cited

U.S. PATENT DOCUMENTS 5,354,414 A * 10/1994 Feygin .................. B22C 9/00
156/245
5,637,175 A * 6/1997 Feygin .................. B22C 9/00
156/256

FOREIGN PATENT DOCUMENTS

| JP | H07186277 | 7/1995 |
| JP | H0976355 | 3/1997 |
| JP | 2000280358 | 10/2000 |
| JP | 2003-071530 | 3/2003 |
| JP | 2003071530 A * | 3/2003 |

OTHER PUBLICATIONS

"Office Action of Japan Counterpart Application", dated May 23, 2017, with English translation thereof, p. 1-p. 7, in which the listed references were cited.

* cited by examiner

*Primary Examiner* — Jacob T Minskey
*Assistant Examiner* — Matthew Hoover
(74) *Attorney, Agent, or Firm* — JCIPRNET (57) ABSTRACT

A three-dimensional modeling method having a high degree of flexibility in selecting sheet materials, and capable of performing modeling with high accuracy is provided. In each of a plurality of sheets used for the three-dimensional modeling method in one aspect of the disclosure, a body layer 2 to be cut in a cutting step and an adhesive layer 3 formed on at least a partial region of a surface of the body layer 2 and serving for adhesion to another sheet are stacked.

10 Claims, 9 Drawing Sheets

THREE-DIMENSIONAL MODELING METHOD

CROSS-REFERENCE TO RELATED APPLICATION

This application claims the priority benefit of Japan application serial no. 2013-238250, filed on Nov. 18, 2013. The entirety of the above-mentioned patent application is hereby incorporated by reference herein and made a part of this specification.

TECHNICAL FIELD

The present invention relates to a three-dimensional (3D) modeling method.

DESCRIPTION OF THE BACKGROUND ART

Various modeling methods of stacking sheets to form a three-dimensional modeled object have been proposed, and for example, a three-dimensional modeling method using metallic sheets as disclosed in Japanese Unexamined Patent Application Publication No. 2003-71530 (published on Mar. 11, 2003) is known. Japanese Unexamined Patent Application Publication No. 2003-71530 discloses a technology of stacking two metallic sheets to fasten the sheets by laser welding and then cutting the sheets by irradiating an upper metallic sheet with laser light at least twice to model a laminate.

However, the technology disclosed in Japanese Unexamined Patent Application Publication No. 2003-71530 cannot be applied to sheet materials that cannot be subjected to laser welding and thus, this is a modeling method limited to metallic sheets.

SUMMARY

Therefore, the present invention is made in consideration of the above-described problem, and its object is to provide a three-dimensional modeling method having a high degree of flexibility in selecting sheet materials, and capable of performing modeling with high accuracy.

To solve the problem, a first three-dimensional modeling method according to the present invention is a three-dimensional modeling method of stacking a plurality of sheets to perform three-dimensional modeling, and the three-dimensional modeling method including: a fastening step of fastening the stacked sheets to each other; a cutting step of irradiating an upper sheet of the stacked sheets with laser light to cut the upper sheet after the fastening step; and a removing step of removing at least a part of an unnecessary portion of the upper sheet cut in the cutting step, wherein in each of the sheets, a body layer to be cut in the cutting step and an adhesive layer formed on at least a partial region of a surface of the body layer and serving for adhesion to another sheet are stacked, and the sheets are fastened to each other using the adhesive layer in the fastening step, and the fastening step and the cutting step are repeated and the removing step is performed each time the upper sheet is cut in the cutting step to form a three-dimensional structure composed of the plurality of stacked sheets.

According to the above-described configuration, since each sheet is provide with the adhesive layer serving for adhesion to another sheet, the sheets can be fastened to each other using the adhesive layer without the need of performing laser welding as in the related art. Therefore, it is possible to provide a three-dimensional modeling method that achieves a high degree of flexibility in selecting materials without limiting a sheet material to metal.

Moreover, according to the above-described configuration, since the removing step is performed each time one sheet is cut in the cutting step, a highly accurate three-dimensional structure can be formed as compared to the mode of stacking a plurality of sheets and then irradiating the sheets with laser light to cut a sheet laminate at a time.

To solve the above-described problem, a second three-dimensional modeling method according to the present invention is a three-dimensional modeling method of stacking a plurality of sheets to perform three-dimensional modeling, and the three-dimensional modeling method including: a cutting step of irradiating one sheet with laser light to cut the one sheet; a fastening step of stacking the one sheet cut in the cutting step on another sheet and fastening the sheets to each other; and a removing step of removing at least a part of an unnecessary portion of the one sheet after the fastening step, wherein in each of the sheets, a body layer to be cut in the cutting step and an adhesive layer formed on at least a partial region of a surface of the body layer and serving for adhesion to another sheet are stacked, and the sheets are fastened to each other by the adhesive layer in the fastening step, and the cutting step and the fastening step are repeated and the removing step is performed after each fastening step to form a three-dimensional structure composed of the plurality of stacked sheets.

According to the above-described configuration, since each sheet is provided with the adhesive layer serving for adhesion to another sheet, the sheets can be fastened to each other using the adhesive layer without the need of performing laser welding as in the related art. Therefore, it is possible to provide a three-dimensional modeling method that achieves a high degree of flexibility in selecting materials without limiting a sheet material to metal.

Moreover, according to the above-described configuration, since one sheet is cut in the cutting step and the removing step is performed each time the one sheet is fastened to a lower sheet in the fastening step, a highly accurate three-dimensional structure can be formed as compared to the mode of stacking a plurality of sheets and then irradiating the sheets with laser light to cut a sheet laminate at a time.

Moreover, in one aspect of the first and second three-dimensional modeling methods according to the present invention, in addition to the above-described configuration, the sheets are caused to adhere to each other by irradiating the adhesive layer with adhering laser light which is different from the laser light used in the cutting step in wavelength or strength.

According to the above-described configuration, the sheets can be caused to adhere to each other by a simple technique of laser irradiation.

Moreover, since the laser light used for adhesion is laser light different from the laser light used in the cutting step in wavelength or strength, the sheet is not cut at the time of adhesion.

Moreover, in one aspect of the first and second three-dimensional modeling methods according to the present invention, in addition to the above-described configuration, the adhesive layer is a layer that absorbs the adhering laser light.

According to the above-described configuration, since the adhering laser light is absorbed by the adhesive layer, a highly accurate three-dimensional structure can be achieved without irradiating a sheet and an adhesive layer below the adhesive layer with the adhering laser light.

Moreover, in one aspect of the first and second three-dimensional modeling methods according to the present invention, in addition to the above-described configuration, the sheet is irradiated with the laser light at different angles between one cutting step and another cutting step.

According to the above-described configuration, various shapes can be modeled.

Moreover, in one aspect of the first and second three-dimensional modeling methods according to the present invention, in addition to the above-described configuration, in the one cutting step, the sheet is irradiated with the laser light at different irradiation angles at least twice.

According to the above-described configuration, cut faces of various shapes, such as a round-cornered cut face, of the body layer of the sheet can be formed by irradiating the sheet with the laser light at different angles in the cutting step.

Moreover, in one aspect of the first and second three-dimensional modeling methods according to the present invention, in addition to the above-described configuration, only a part of the unnecessary portion of the one sheet is removed in the removing step, and the three-dimensional modeling method further includes: a remainder removing step of removing the remainder of the unnecessary portion of the one sheet after fastening another sheet onto the one sheet in the fastening step.

According to the above-described configuration, various three-dimensional structures can be modeled. For example, it is possible to form a three-dimensional modeled object as a hollow structure in which a portion composed of a plurality of stacked sheets is hung from a ceiling of its hollow portion.

The present invention can provide a three-dimensional modeling method having a high degree of flexibility in selecting sheet materials, and capable of performing modeling with high accuracy.

DETAILED DESCRIPTION OF THE INVENTION

Embodiment 1

The present invention relates to a technology of forming a three-dimensional structure by repeating treatment of stacking sheets, cutting an upper sheet into a desired shape, stacking a new sheet thereon, and then cutting the new sheet into a desired shape. Accordingly, hereinafter, as one aspect of the present invention, a configuration of stacked sheets will be described first, and subsequently laser light used in a three-dimensional modeling method and then the three-dimensional modeling method will be described in detail.

(1) Configuration of Sheet

Figure 1:
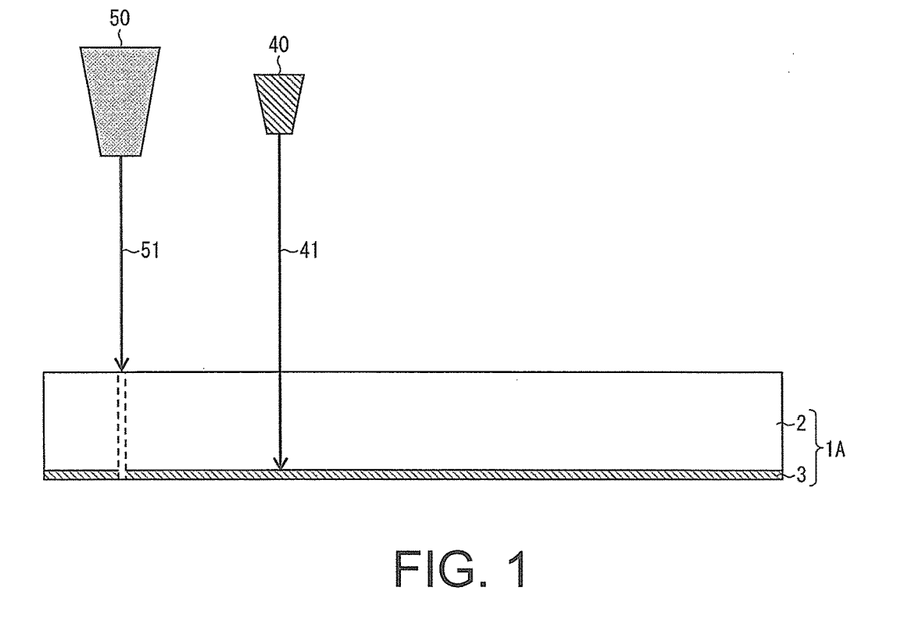
FIG. 1 is a schematic view of a sheet used in a three-dimensional modeling method in an embodiment according to the present invention, and laser light for modeling the sheet.
Figure 2:
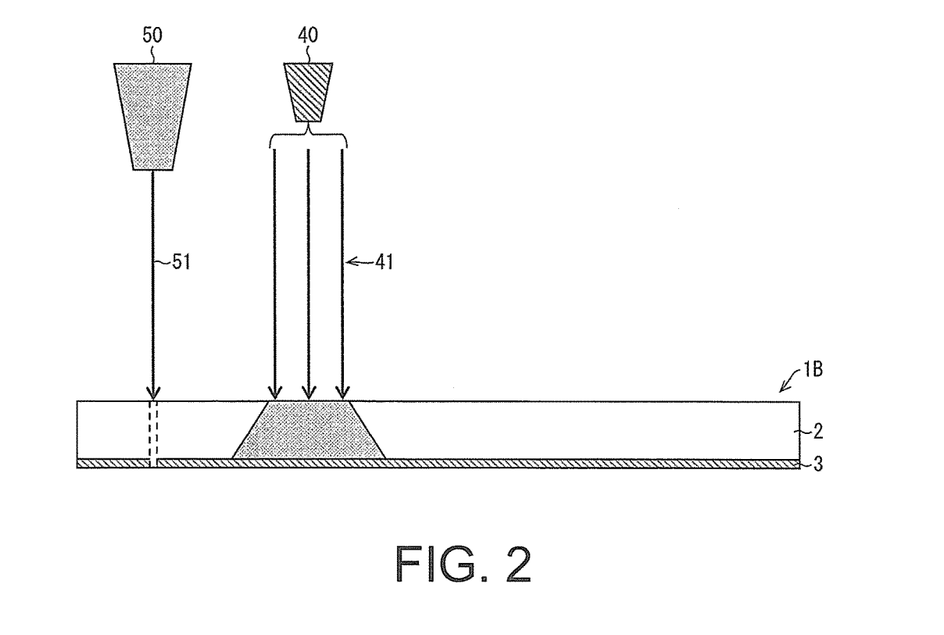
FIG. 2 is a schematic view of a sheet used in a three-dimensional modeling method in an embodiment according to the present invention, and laser light for modeling the sheet.

FIG. 1 and FIG. 2 each show a sheet that can be used in a three-dimensional modeling method according to the present invention.

In each of a plurality of sheets used in the three-dimensional modeling method in Embodiment 1, a body layer 2 to be cut in a cutting step, and an adhesive layer 3 formed on at least a partial region of a surface of the body layer 2 and serving for adhesion to another sheet are stacked. Here, FIG. 1 shows a sheet 1A having the body layer 2 made of a transparent material, and FIG. 2 shows a sheet 1B having the body layer 2 made of an opaque material.

(1-1) Sheet 1A Having Body Layer 2 Made of Transparent Material

The body layer 2 made of the transparent material of the sheet 1A shown in FIG. 1 can be made of, for example, acrylic, polyester, polyethylene, nylon, polypropylene, or glass. It is noted that the body layer 2 made of the transparent material is not limited to a layer made of one type of transparent material. The thickness of the body layer 2 can be from a few μm to a few cm.

In the case of the sheet 1A having the body layer 2 made of the transparent material in FIG. 1, in order to fasten sheets to each other, a lower sheet 1A and an upper sheet 1A are fastened to each other in a laser-irradiated region by stacking the lower sheet 1A and the upper sheet 1A such that the adhesive layer 3 included in the upper sheet 1A comes in contact with the body layer 2 included in the lower sheet 1A, and irradiating the adhesive layer 3 included in the upper sheet 1A with laser light from above the upper sheet 1A.

For the adhesive layer 3 stacked on the body layer 2 made of the transparent material, an infrared absorption layer that can absorb an infrared ray to cause body layers 2 to adhere to each other and fasten the sheets to each other can be used. By irradiating the adhesive layer 3 with infrared laser light in the state where the sheet 1A including the adhesive layer 3 as the infrared absorption layer and another sheet are stacked, the adhesive layer is melted by heating to achieve adhesion (fastening) to the another sheet.

The adhesive layer 3 may be a coating film formed by coating one face of the body layer 2, or may be a deposited film, or may be a laminated film. The thickness of the adhesive layer 3 can be in the order of a few μm to 10 μm. It is noted that the adhesive layer 3 is formed on the whole one face of the body layer 2 in FIG. 1, but may be formed on a part of the one face as described later.

It is noted that the adhesive layer 3 included in the sheet 1A is not limited to the infrared absorption layer, and may be a layer made of a material that melts by heating with laser irradiation. Moreover, regardless of whether the adhesive layer 3 is the infrared absorption layer or the layer made of a material that melts by heating with laser irradiation, the adhesive layer 3 is preferably made of a material that absorbs about 90% of the irradiated fastening laser light. This can prevent the fastening laser light from affecting the lower sheet, the adhesive layer, and the body layer.

(1-2) Sheet 1B Having Body Layer 2 Made of Opaque Material

The body layer 2 made of the opaque material shown in FIG. 2 can be made of, for example, metal, stone, wood, or opaque plastic. It is noted that the body layer 2 made of the opaque material is not limited to a layer made of one type of opaque material. Like the body layer 2 made of the transparent material in FIG. 1, the thickness of the body layer 2 made of the opaque material can be from a few μm to a few cm.

Unlike the body layer 2 made of the transparent material shown in FIG. 1, the body layer 2 shown in FIG. 2 is made of the opaque material. Accordingly, the adhesive layer 3 cannot directly be irradiated with the fastening laser light in order to melt the adhesive layer 3 by heating.

Then, for the adhesion layer 3 in the case of the sheet 1B having the body layer 2 made of the opaque material shown in FIG. 2, a thermoplastic hot-melt adhesive can be used. Also in the case of FIG. 2, laser (fastening laser light) irradiation is performed in order to melt the adhesive layer 3 by heating. However, the fastening laser light is absorbed by the surface of the body layer 2 made of the opaque material, and the heat is conducted to melt the adhesive layer 3 by heating. As a result, as in FIG. 1, the lower sheet 1A is fastened to the upper sheet 1A in a laser-irradiated region (heat-conducted region). For the adhesive layer 3, a resin may used, or metal that melts by heating, such as solder, tin, and zinc, may be used other than the thermoplastic hot-melt adhesive.

(2) Type of Laser Used in Three-Dimensional Modeling Method (Configuration of Device Used in Three-Dimensional Modeling Method)

Here, FIG. 1 and FIG. 2 show a fastening laser light irradiation unit 40 and a cutting laser light irradiation unit 50 included in a three-dimensional modeling device for achieving the three-dimensional modeling method in Embodiment 1.

The fastening laser light irradiation unit 40 performs irradiation of fastening laser light 41 (adhering laser light) for melting the adhesive layer 3 by heating.

For the sheet 1A including the body layer 2 made of the transparent material shown in FIG. 1, infrared laser light is used as the fastening laser light 41 that is the laser light with which the adhesive layer 3 is irradiated. As shown in FIG. 1, the infrared laser light as the fastening laser light 41 passes through the body layer 2, and the adhesive layer 3 is directly irradiated with the infrared laser light to melt by heating in the irradiated region. The fastening laser light irradiation unit 40 that performs the infrared laser light irradiation includes a semiconductor laser, and performs irradiation of near-infrared laser light that is weaker than cutting laser light 51 of which irradiation is performed by the cutting laser light irradiation unit 50, as the fastening laser light 41.

On the other hand, for the sheet 1B including the body layer 2 made of the opaque material shown in FIG. 2, the fastening laser light irradiation unit 40 includes a semiconductor laser, and performs irradiation of near-infrared laser light that has lower strength than the cutting laser light 51 of which irradiation is performed by the cutting laser light irradiation unit 50, as the fastening laser light 41, to melt the adhesive layer 3 by heating with heat conducted through the body layer 2 as described above.

The cutting laser light irradiation unit 50 performs irradiation of the cutting laser light 51 for cutting the body layer 2 by laser irradiation. In both the case using the sheet 1A in FIG. 1 and the case using the sheet 1B in FIG. 2, the cutting laser light irradiation unit 50 performs irradiation of near-infrared laser light that has higher strength as compared to the fastening laser light irradiation unit 40, or laser light having a wavelength between the near-infrared laser light and the far-infrared laser light, as the cutting laser light 51.

The fastening laser light irradiation unit 40 and the cutting laser light irradiation unit 50 each include a transfer unit not shown for changing the irradiation position. It is noted that the number of fastening laser light irradiation units 40 and cutting laser light irradiation units 50 is not limited to one, and may be more than one.

Alternatively, as described later, the cutting laser light irradiation unit 50 may have a mechanism (not shown) that can change an incidence angle of the laser light to the body layer 2.

(3) Three-Dimensional Modeling Method

The three-dimensional modeling method in Embodiment 1 includes a fastening step of fastening stacked sheets to each other by the adhesive layer 3, a cutting step of irradiating an upper sheet of the stacked sheets with laser light to cut the upper sheet after the fastening step, and a removing step of removing an unnecessary portion of the upper sheet cut in the cutting step, and the fastening step and the cutting step are repeated, and a removing step is performed each time the upper sheet is cut in the cutting step to form a three-dimensional structure composed of the plurality of stacked sheets. This will be described below with reference to FIGS. 3A to 3C. It is noted that the three-dimensional modeling method performed using the sheet 1A shown in FIG. 1 will be described below, but the three-dimensional modeling method is also applicable to the sheet 1B shown in FIG. 2.

Figure 3A:
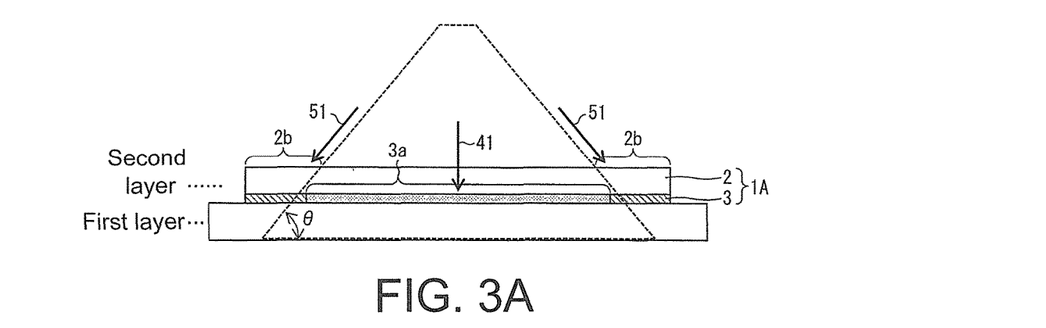
FIGS. 3A to 3C are views for illustrating a three-dimensional modeling method in an embodiment according to the present invention.
Figure 3B:
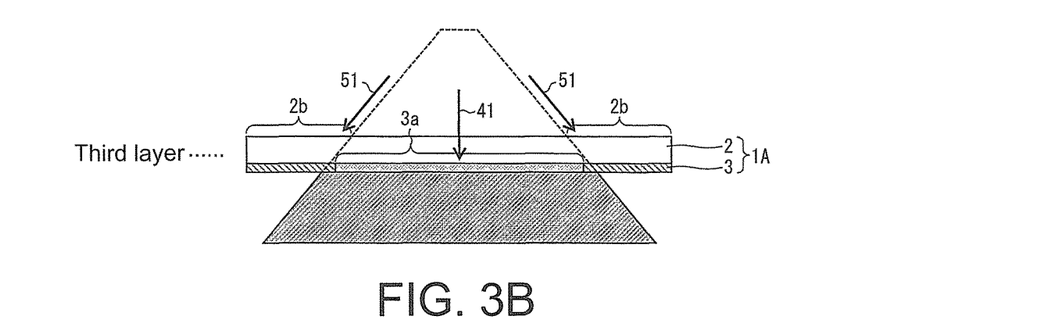
Figure 3C:
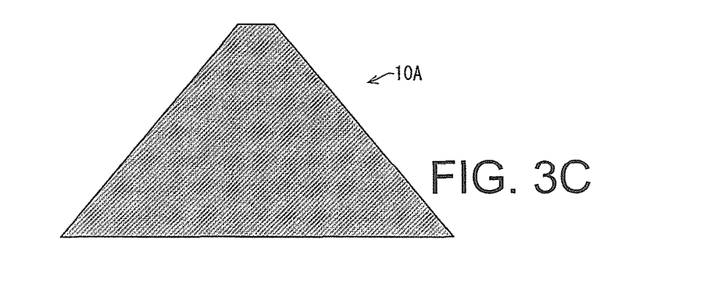

FIGS. 3A to 3C are views for illustrating the three-dimensional modeling method in Embodiment 1, and FIGS. 3A, 3B, and 3C show a course of treatment in this order.

In Embodiment 1, the three-dimensional modeling method of forming a pyramid-shaped three-dimensional modeled object 10A shown in FIG. 3C as a finished article will be described.

FIG. 3A shows the progress of the three-dimensional modeling method, and shows a situation in which a bottom of the pyramid-shaped finished article shown in FIG. 3C is formed. In Embodiment 1, a plurality of sheets 1A is stacked from the bottom toward the top of the pyramid-shaped finished article to model a three-dimensional structure.

FIG. 3A shows the state where the sheet 1A in a second layer is stacked on a sheet in a first layer (the sheet in the first layer may be the sheet 1A shown in FIG. 1 but may be another base sheet). The adhesive layer 3 included in the sheet 1A in the second layer is in contact with an upper face of the sheet in the first layer. In this state, as shown in FIG. 3A, the adhesive layer 3 is irradiated with the fastening laser light 41 from above the sheet 1A in the second layer to fasten the sheet in the first layer to the sheet 1A in the second layer by the adhesive layer 3 (fastening step).

The size of a region irradiated with the fastening laser light 41 in the fastening step is set to be the same as or smaller than the size of the sheet 1A in the second layer, which is cut in the cutting step (same as the size of an overlapping region of the cut sheet 1A in the second layer and the sheet in the first layer). For example, in order to prevent an end of the adhesive layer 3 fastened in the region irradiated with the fastening laser light 41 from protruding from a cut end of the cut sheet 1A in the second layer due to heat generated in the three-dimensional modeled object being modeled (heat generated by irradiation of the cutting laser light and other generated heat), the size of an adhered region 3a (fastened region) formed on the adhesive layer 3 by irradiation of the fastening laser light 41 is preferably set to be smaller than the size of the sheet 1A in the second layer which is cut in the cutting step.

It is noted that the sheet 1A in the second layer may be pressed onto the sheet in the first layer during irradiation of the fastening laser light 41. The pressing can reliably fasten the sheet in the first layer to the sheet 1A in the second layer. The pressing can also be applied to the sheets 1A in third and subsequent layers.

The thickness of the adhesive layer 3 may vary before and after the fastening step. For example, in the case of applying pressing force as described above, the thickness of the adhesive layer 3 (that is, adhered region 3a) after the fastening step may be smaller than the thickness before the fastening step.

Moreover, the sheet in the second layer is stacked on the sheet in the first layer, which is mounted on a mounting table not shown. Then, in order to mount the sheet in the first layer at a predetermined position of the mounting table, the mounting table is preferably provided with a positioning mechanism. A positioning pin or the like may be used as the positioning mechanism. It is noted that, as for overlaying the sheets with each other, a positioning step may also be included in order to stack the upper sheet at a predetermined place of the lower sheet. The positioning step can be performed by using a positioning mark provided on the unnecessary portion of the sheet as a guide, or the sheet can also be positioned at a predetermined position by providing a positioning pin for each sheet on the above-described mounting table and brining the end of the sheet into contact with the pin.

After irradiation of the fastening laser light 41, a predetermined location of the body layer 2 is irradiated with the cutting laser light 51 from above the sheet 1A in the second layer. The body layer 2 of the sheet 1A in the second layer absorbs the cutting laser light 51 to cause melting and evaporation, thereby being cut at the irradiation location (cutting step).

Moreover, in Embodiment 1, irradiation of the cutting laser light 51 is not performed in the vertical direction, but is performed along the direction in which an incidence angle to the surface of the body layer 2 of the sheet 1A in the second layer is inclined by an angle θ with respect to the horizontal direction. Thereby, a part of an inclined face of a pyramid can be formed on the cut face of the sheet 1A in the second layer.

Moreover, assist air is used at the time of cutting by the cutting laser light 51. The assist air can blow a cut unnecessary portion 2b off to remove the portion (removing step). In this case, a member having the cutting laser light 51 integrated with the assist air can be used or the cutting laser light and the assist air can be used as separate members by bring these members close to each other.

It is noted that the method of removing the unnecessary portion 2b is not limited to the above-described method, and for example, may include a configuration in which the unnecessary portion is removed by being absorbed by an absorbing unit. Moreover, the cutting step and the removing step need not be performed simultaneously as in Embodiment 1.

It is noted that, in FIG. 3A, the body layer 2 of the sheet 1A in the second layer is cut by the cutting laser light 51 to remove the unnecessary portion 2b of the body layer 2, and subsequently the sheet in the first layer is irradiated with the cutting laser light 51 at the same irradiation angle to cut the sheet in the first layer. At this time, the cut unnecessary portion of the sheet in the first layer is also removed. It is noted that the sheet in the first layer may be cut in advance.

FIG. 3B shows the state where the sheet 1A in the third layer is stacked on the structure in which the sheet in the first layer and the sheet 1A in the second layer are cut into desired shapes in the above-described steps and the unnecessary portion 2b is removed. The adhesive layer 3 included in the sheet 1A in the third layer is in contact with the upper face of the sheet 1A in the second layer (more specifically, the upper face of the body layer 2). In this state, the fastening step, the cutting step, and the removing step, which are performed on the above-described sheet 1A in the second layer, are performed on the sheet 1A in the third layer in this order. When the sheet 1A in the third layer is cut in the cutting step, irradiation of the cutting laser light 51 is performed closer to the center of the sheet 1A than when the sheet 1A in the second layer is cut, while maintaining the same irradiation angle as when the sheet 1A in the second layer is cut. As a result, the horizontal cross section of the sheet 1A in the third layer becomes smaller than that of the sheet 1A in the second layer, and a part of a pyramid having a horizontal cross section that becomes smaller in the stacking direction can be formed.

Each time a new sheet 1A is stacked in this manner, the newly stacked sheet 1A is subjected to the fastening step, the cutting step, and the removing step. A three-dimensional structure is modeled by repeating the steps to form the three-dimensional modeled object 10A as the finished article shown in FIG. 3C.

It is noted that, in Embodiment 1, the height of the three-dimensional modeled object 10A is the total number of the stacked sheets. It is noted that the number of the stacked sheets may be selected depending on the thickness of the sheet, the height of the three-dimensional modeled object desired to be formed, or the like.

(4) Modification Example

In Embodiment 1, the upper sheet 1A is subjected to the fastening step, first and then, the cutting step. However, the present invention is not limited to this, and the fastening step and the cutting step may be simultaneously performed.

Alternatively, a sheet 1A before being stacked on a sheet (for example, the sheet 1A in a second layer) may be subjected to the cutting step, and then the sheet 1A (the sheet 1A in the second layer) may be stacked on another sheet (the sheet 1A in a first layer) to be subjected to the fastening step. After the fastening step, an unnecessary portion 2b generated in the cutting step may be removed.

Moreover, Embodiment 1 has described the mode in which the surface of the sheet 1A at a certain cutting location is irradiated with the cutting laser light 51 having the determined (predetermined unidirectional) irradiation angle in one cutting step. However, the present invention is not limited to this, and a mode in which the surface of the sheet 1A at a certain cutting location is irradiated with the laser light at different irradiation angles at least twice may be adopted. Cut faces of various shapes, such as a round-cornered cut face of the body layer 2 of the sheet, can be formed by laser irradiation at different angles.

Moreover, Embodiment 1 has described the mode of performing irradiation of the cutting laser light 51 having a certain determined (predetermined unidirectional) irradiation angle in any cutting step. However, the present invention is not limited to this, and the irradiation angle of the cutting laser light 51 can be appropriately changed to model three-dimensional structures having cut faces of various inclination angles.

Embodiment 2

Another aspect of a three-dimensional modeling method according to the present invention will be described below with reference to FIGS. 4A to 4C. It is noted that the same members as those in Embodiment 1 are given the same reference numerals and thus, description thereof is omitted.

The three-dimensional modeling method described in Embodiment 1 is different from the three-dimensional modeling method in Embodiment 2 in a configuration (shape) of a finished article.

Figure 4A:
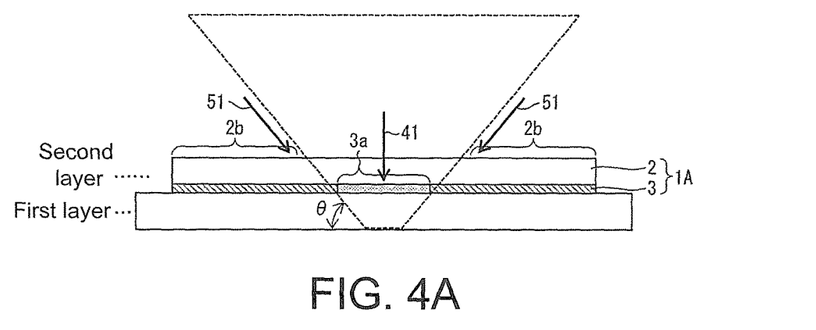
FIGS. 4A to 4C are views for illustrating a three-dimensional modeling method in an embodiment according to the present invention.
Figure 4B:
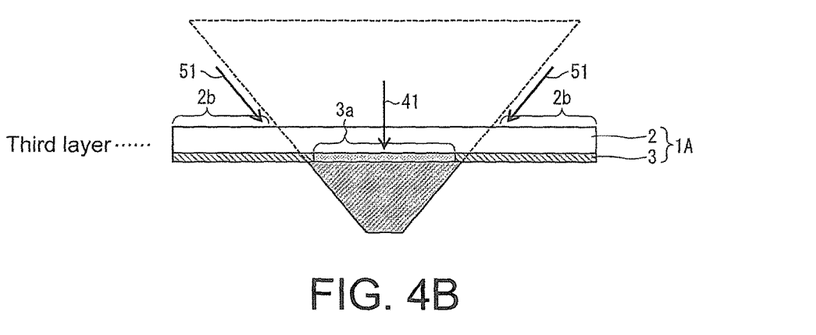
Figure 4C:
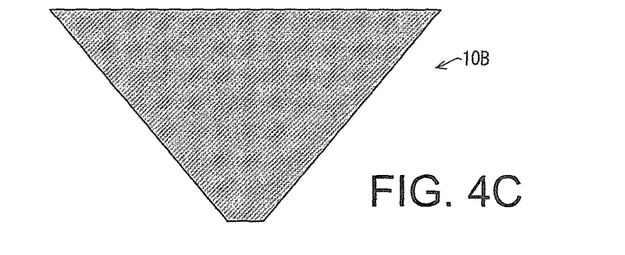

FIGS. 4A to 4C are views for illustrating the three-dimensional modeling method in Embodiment 2, and FIGS. 4A, 4B, and 4C show a course of treatment in this order. In Embodiment 2, the three-dimensional modeling method for forming an inverted pyramid-shaped three-dimensional modeled object 10B shown in FIG. 4C as a finished article will be described. It is noted that the three-dimensional modeling method performed using the sheet 1A shown in FIG. 1 will be described, but the three-dimensional modeling method is also applicable to the sheet 1B shown in FIG. 2.

FIG. 4A shows the progress of the three-dimensional modeling method, and shows the situation in which the bottom of the inverted pyramid-shaped finished article shown in FIG. 4C is formed. In Embodiment 2, a plurality of sheets 1A is stacked from the bottom having a smaller horizontal cross section toward the top having a larger horizontal cross section of the inverted pyramid-shaped finished article to model a three-dimensional structure.

FIG. 4A shows the state where the sheet 1A in a second layer is stacked on a sheet in a first layer (the sheet in the first layer may be the sheet 1A shown in FIG. 1 or may be another base sheet). An adhesive layer 3 included in the sheet 1A in the second layer is in contact with an upper face of the sheet in the first layer. In this state, as shown in FIG. 4A, the adhesive layer 3 is irradiated with fastening laser light 41 from above the sheet 1A in the second layer to fasten the sheet in the first layer to the sheet 1A in the second layer by the adhesive layer 3 (fastening step).

The size of a region irradiated with the fastening laser light 41 in the fastening step is set to be the same as or smaller than the size of the sheet 1A in the second layer, which is cut in the cutting step (same as the size of an overlapping region of the cut sheet 1A in the second layer and the sheet in the first layer). For example, in order to prevent an end of the adhesive layer 3 fastened in the region irradiated with the fastening laser light 41 from protruding from a cut end of the cut sheet 1A in the second layer due to heat generated in the three-dimensional modeled object being formed (heat generated by irradiation of the cutting laser light and other generated heat), the size of an adhered region 3a (fastened region) formed on the adhesive layer 3 by irradiation of the fastening laser light 41 is preferably set to be smaller than the size of the sheet 1A in the second layer which is cut in the cutting step.

After irradiation of the fastening laser light 41, a predetermined location of the body layer 2 is irradiated with cutting laser light 51 from above the sheet 1A in the second layer. The body layer 2 of the sheet 1A in the second layer absorbs the cutting laser light 51 to cause melting and evaporation, thereby being cut at the irradiation location (cutting step).

At this time, irradiation of the cutting laser light 51 is not performed in the vertical direction, but is performed along the direction in which an incidence angle to the surface of the body layer 2 of the sheet 1A in the second layer is inclined by an angle θ with respect to the horizontal direction.

Moreover, preferably, at the time of cutting by the cutting laser light 51, assist air is used to blow a cut unnecessary portion 2b off to remove the portion (removing step). It is noted that the method of removing the unnecessary portion 2b is not limited to this, and the cutting step and the removing step need not be performed simultaneously.

It is noted that, in FIG. 4A, the body layer 2 of the sheet 1A in the second layer is cut by the cutting laser light 51 to remove the unnecessary portion 2b of the body layer 2 and subsequently, the sheet in the first layer is irradiated with the cutting laser light 51 at the same irradiation angle to cut the sheet in the first layer. At this time, the cut unnecessary portion of the sheet in the first layer is also removed. It is noted that the sheet in the first layer may be cut in advance.

FIG. 4B shows the state where the sheet 1A in a third layer is stacked on the structure in which the sheet in the first layer and the sheet 1A in the second layer are cut into desired shapes in the above-described steps and the unnecessary portion 2b is removed. The adhesive layer 3 included in the sheet 1A in the third layer is in contact with the upper face of the sheet 1A in the second layer (more specifically, the upper face of the body layer 2). In this state, the same steps as the fastening step, the cutting step, and the removing step performed on the above-described sheet 1A in the second layer are performed.

Each time a new sheet 1A is stacked in this manner, the new sheet 1A is subjected to the fastening step, the cutting step, and the removing step. A three-dimensional structure is modeled by repeating the steps to form the three-dimensional modeled object 10B as the finished article shown in FIG. 4C.

It is noted that the modification example described in Embodiment 1 is also applicable to Embodiment 2.

Embodiment 3

Another aspect of a three-dimensional modeling method according to the present invention will be described below with reference to FIGS. 5A to 5C. It is noted that the same members as those in Embodiment 1 are given the same reference numerals and thus, description thereof is omitted.

The three-dimensional modeling method described in Embodiment 1 is different from the three-dimensional modeling method in Embodiment 3 in a configuration (shape) of a finished article.

Figure 5A:
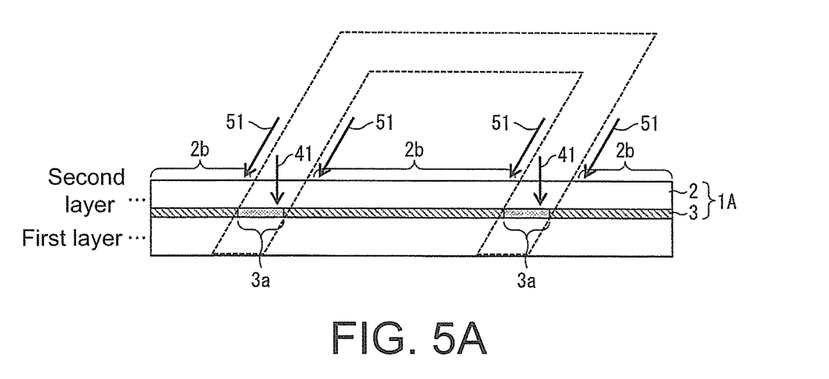
FIG. 5A to 5C are views for illustrating a three-dimensional modeling method in an embodiment according to the present invention.
Figure 5B:
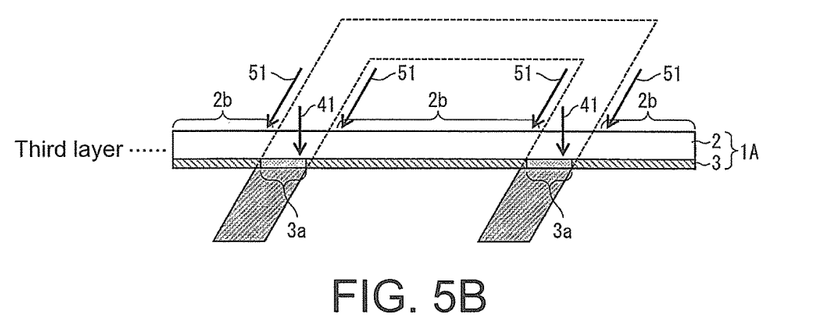
Figure 5C:
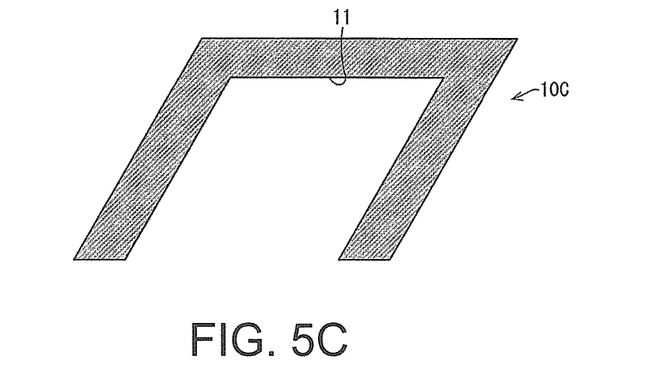

FIGS. 5A to 5C are views for illustrating the three-dimensional modeling method in Embodiment 3, and FIGS. 5A, 5B, and 5C show a course of treatment in this order. In Embodiment 3, the three-dimensional modeling method for forming an arch-shaped three-dimensional modeled object 10C shown in FIG. 5C as a finished article will be described. It is noted that the three-dimensional modeling method performed using the sheet 1A shown in FIG. 1 will be described below, but the three-dimensional modeling method is also applicable to the sheet 1B shown in FIG. 2.

FIG. 5A shows the progress of the three-dimensional modeling method, and shows the situation in which the bottom of the arch-shaped finished article shown in FIG. 5C is formed. In Embodiment 3, a plurality of sheets 1A is stacked from a plurality of legs toward an arch formed by connecting these legs to each other on the top of the arch-shaped finished article to model a three-dimensional structure.

FIG. 5A shows the state where the sheet 1A in a second layer is stacked on a sheet in a first layer (the sheet in the first layer may be the sheet 1A shown in FIG. 1 or may be another base sheet). An adhesive layer 3 included in the sheet 1A in the second layer is in contact with an upper face of the sheet in the first layer. In this state, as shown in FIG. 5A, the adhesive layer 3 is irradiated with fastening laser light 41 from above the sheet 1A in the second layer to fasten the sheet in the first layer to the sheet 1A in the second layer by the adhesive layer 3 (fastening step).

The size of a region irradiated with the fastening laser light 41 in the fastening step is set to be the same as or smaller than the size of the sheet 1A in the second layer, which is cut in the cutting step (same as the size of an overlapping region of the cut sheet 1A in the second layer and the sheet in the first layer). For example, in order to prevent an end of the adhesive layer 3 fastened in the region irradiated with the fastening laser light 41 from protruding from a cut end of the cur sheet 1A in the second layer due to heat generated in the three-dimensional modeled object being formed (heat generated by irradiation of the cutting laser light and other generated heat), the size of an adhered region 3a (fastened region) formed on the adhesive layer 3 by irradiation of the fastening laser light 41 is preferably set to be smaller than the size of the sheet 1A in the second layer which is cut in the cutting step.

After irradiation of the fastening laser light 41, a predetermined location of the body layer 2 is irradiated with cutting laser light 51 from above the sheet 1A in the second layer. The body layer 2 of the sheet 1A in the second layer absorbs the cutting laser light 51 to cause melting and evaporation, thereby being cut at the irradiation location (cutting step).

At this time, irradiation of the cutting laser light 51 is not performed in the vertical direction, but is performed along the direction in which an incidence angle to the surface of the body layer 2 of the sheet 1A in the second layer is inclined by an angle θ with respect to the horizontal direction. This can model the inclined arch-shaped three-dimensional modeled object 10C shown in FIG. 5C.

Moreover, preferably, at the time of cutting by the cutting laser light 51, assist air is used to blow a cut unnecessary portion 2b off to remove the portion (removing step). It is noted that the method of removing the unnecessary portion 2b is not limited to this, and the cutting step and the removing step need not be performed simultaneously.

It is noted that, in FIG. 5A, the body layer 2 of the sheet 1A in the second layer is cut by the cutting laser light 51, and the unnecessary portion 2b of the body layer 2 is removed and subsequently, the sheet in the first layer is irradiated with the cutting laser light 51 at the same irradiation angle to cut the sheet in the first layer. At this time, the cut unnecessary portion of the sheet in the first layer is also removed. It is noted that the sheet in the first layer may be cut in advance.

FIG. 5B shows the state where the sheet 1A in a third layer is stacked on the structure in which the sheet in the first layer and the sheet 1A in the second layer are cut into desired shapes in the above-described steps and the unnecessary portion 2b is removed. The adhesive layer 3 included in the sheet 1A in the third layer is in contact with an upper face of the sheet 1A in the second layer (more specifically, the upper face of the body layer 2). In this state, the same steps as the fastening step, the cutting step, and the removing step performed on the above-described sheet 1A in the second layer are performed.

Each time a new sheet 1A is stacked in this manner, the new sheet 1A is subjected to the fastening step, the cutting step, and the removing step. A three-dimensional structure is modeled by repeating the steps to form the three-dimensional modeled object 10C as the finished article shown in FIG. 5C.

It is noted that, in the case of Embodiment 3, a lower end face 11 of the arch shown in FIG. 5C is composed of the surface at the adhesive layer 3 side of the sheet 1A located closest to the leg side in the arch.

It is noted that the modification example described in Embodiment 1 is also applicable to Embodiment 3.

Embodiment 4

Another aspect of a three-dimensional modeling method according to the present invention will be described below with reference to FIGS. 6 to 10. It is noted that the same members as those in Embodiment 1 are given the same reference numerals and thus, description thereof is omitted.

The three-dimensional modeling method described in Embodiment 1 is different from the three-dimensional modeling method in Embodiment 4 in a configuration (shape) of a finished article.

Figure 6:
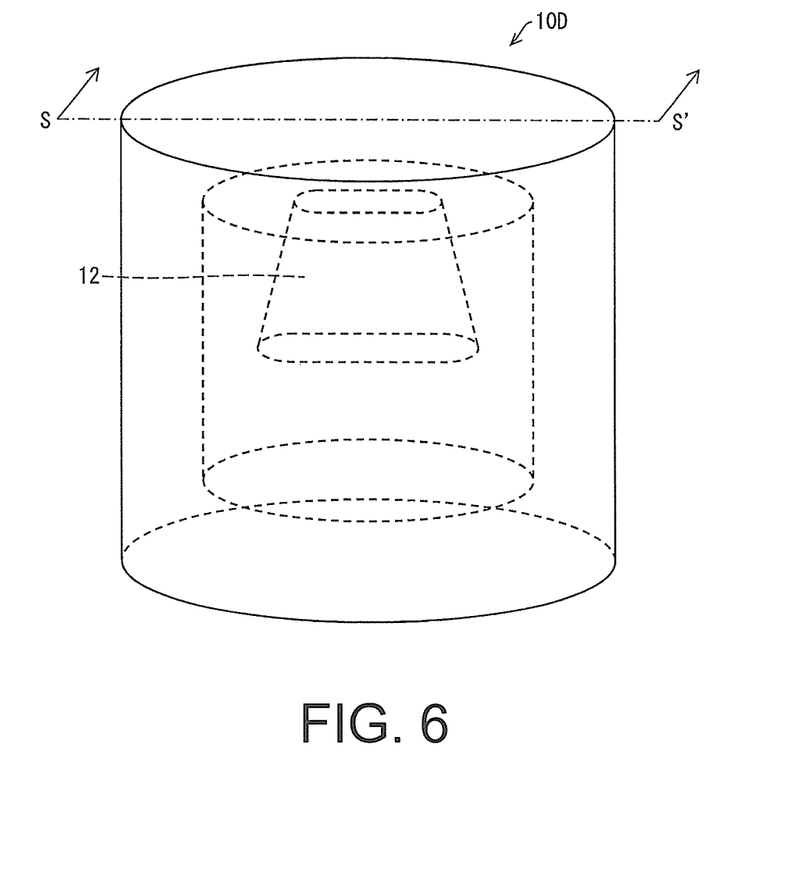
FIG. 6 is a perspective view of a three-dimensional modeled object modeled by a three-dimensional modeling method in an embodiment according to the present invention.
Figure 7:
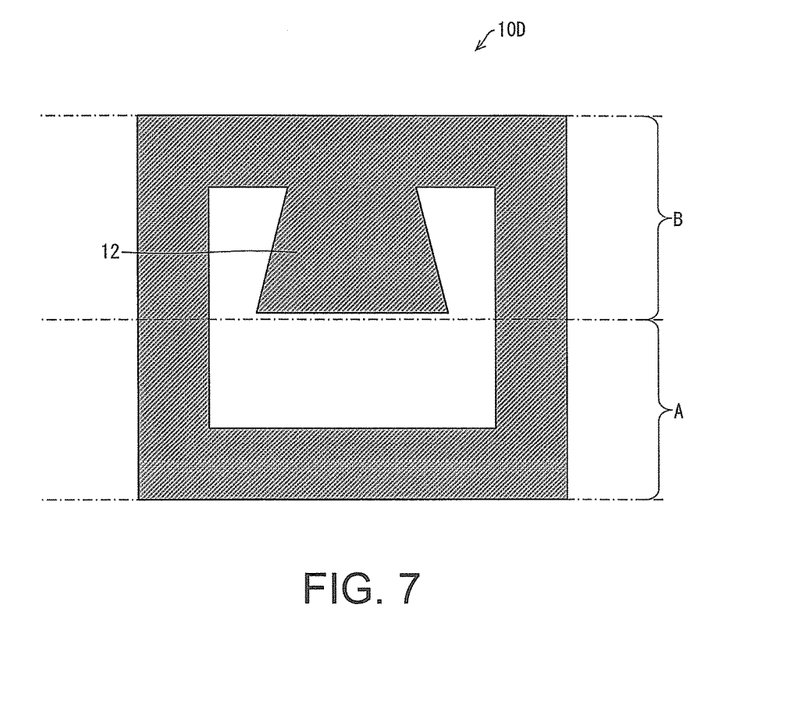
FIG. 7 is a sectional view taken along a cut line S-S' shown in FIG. 6.

FIG. 6 is a perspective view of a three-dimensional modeled object 10D formed by the three-dimensional modeling method in Embodiment 4. FIG. 7 is a sectional view taken along a cut line S-S' in FIG. 6.

As shown in FIG. 6 and FIG. 7, the three-dimensional modeled object 10D formed by the three-dimensional modeling method in Embodiment 4 is a hollow structure having a cylindrical outer face, in which a conical portion 12 composed of a plurality of stacked sheets is hung from a ceiling of its hollow portion.

Even such a seemingly complicated three-dimensional structure can be formed by the three-dimensional modeling method in Embodiment 4. Specifically, the three-dimensional modeled object 10D shown in FIG. 6 and FIG. 7 can be formed using different formation methods between a region A and a region B shown in FIG. 7. However, both the region A and the region B are formed by performing the fastening step, the cutting step, and the removing step for each sheet.

Figure 8:
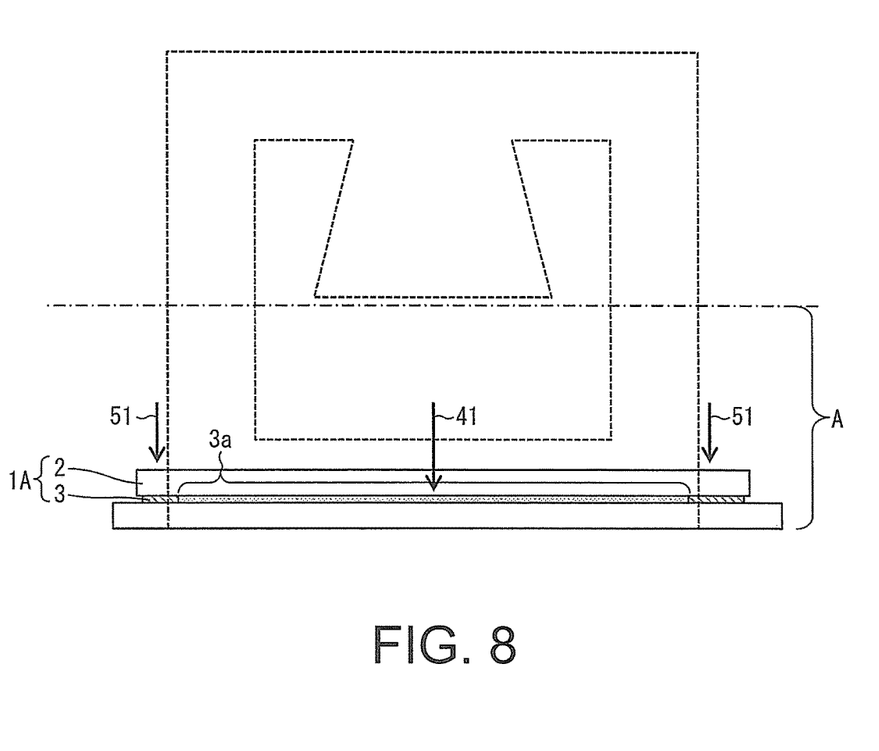
FIG. 8 is a view for illustrating a method of forming the three-dimensional modeled object shown in FIG. 6.
Figure 9:
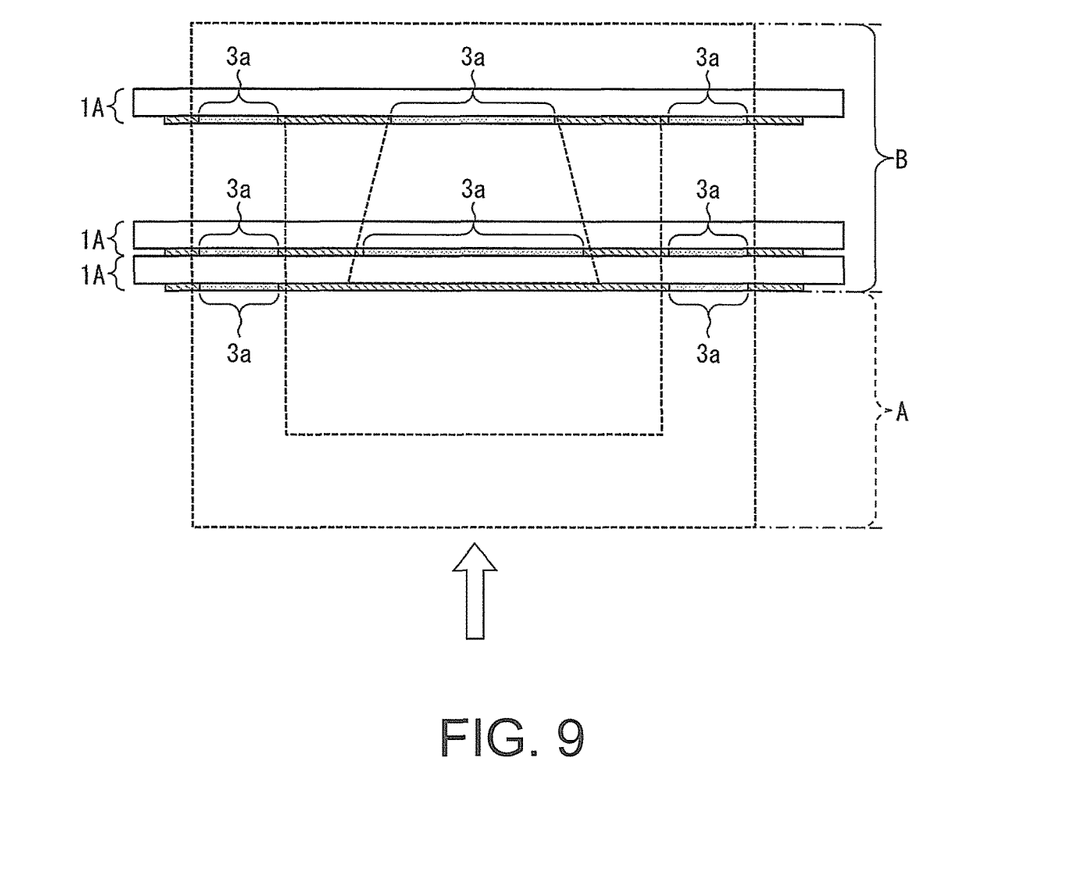
FIG. 9 is a view for illustrating a method of forming the three-dimensional modeled object shown in FIG. 6.

FIG. 8 and FIG. 9 show the specific three-dimensional modeling method in Embodiment 4. FIG. 8 is a view showing a formation process of the region A shown in FIG. 7. Moreover, FIG. 9 is a view showing a formation process of the region B shown in FIG. 7. It is noted that, in the formation process of the region A as shown in FIG. 8, only a cup-shaped three-dimensional modeled object opened to the upper side needs to be formed and can be achieved by combining a part of the above-described formation processes in Embodiments 1 to 3.

In the formation process of the region B as shown in FIG. 9, the region B is formed from the opposite side to the region A side in the region B and can be achieved by combining a part of the above-described formation processes in Embodiments 1 to 3. It is noted that the removing step performed for each sheet is not limited to one-time treatment, and treatment of first removing a portion and subsequently removing a remaining portion may be performed. The same also applies to Embodiments 1 to 3.

Here, in Embodiment 4, a formation method in the case of stacking sheets 1A from the side of the region A in the region B to form the region B shown in FIG. 9 will be described below.

In the process of forming the region B in Embodiment 4, the sheets 1A to be stacked in a layer, in which the conical portion 12 is formed, are fastened to each other in the fastening step and are cut at a predetermined location in the cutting step and then, only a part 2*bb* in the unnecessary portion 2*b* is removed in the removing step. This treatment will be described with reference to FIG. 10.

Figure 10:
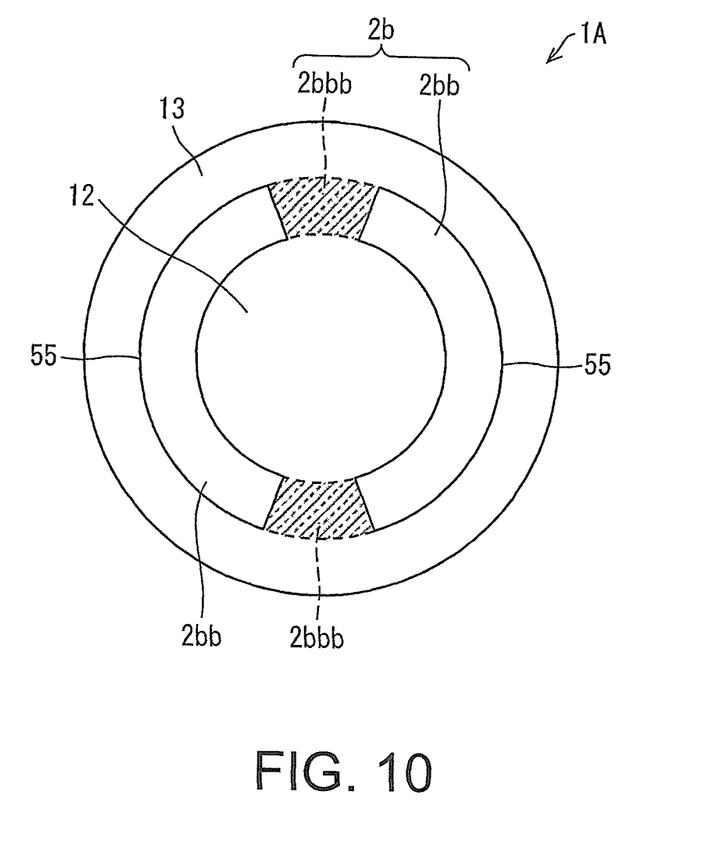
FIG. 10 is a bottom view of a sheet used to form the three-dimensional modeled object shown in FIG. 6.

FIG. 10 is a bottom view of one sheet 1A to be stacked in the layer in which the conical portion 12 shown in FIG. 9 is formed when viewed from a white arrow in FIG. 9. Here, in the sheet 1A to be stacked in the layer in which the conical portion 12 shown in FIG. 9 is formed, an unnecessary region is formed along the whole outer circumference of the conical portion 12 and thus, when the region is removed, the conical portion 12 is also removed.

Accordingly, in the sheet 1A shown in FIG. 10, a cut location 55 formed in the cutting step is formed so as to couple the conical portion 12 to an outer peripheral portion 13 that corresponds to a substantially cylindrical portion constituting the columnar outer face of the three-dimensional modeled object 10D. This prevents the conical portion 12 from being removed. That is, as shown in FIG. 10, a cutting step of removing only the part 2*bb* of the unnecessary portion and leaving a remaining portion as a support portion 2*bbb* is performed in place of forming an unnecessary portion along the whole outer circumference of the conical portion 12.

The support portion 2*bbb* supports a portion that constitutes the conical portion 12 and supports a portion that constitutes the conical portion 12 of another sheet 1A to be stacked, until a certain time point during one or more other sheets are further fastened onto the sheet 1A.

In Embodiment 4, the cutting step and the partial removing step of removing only the part 2*bb* of the unnecessary portion are performed such that the plurality of sheets 1A having the portions that constitute the conical portion 12 has the support portion 2*bbb*.

Then, when the plurality of sheets 1A having the support portion 2*bbb* is stacked and the portion constituting the conical portion 12 completes to stack the sheets up to the substantially upper end of the region B, the support portion 2*bbb* is removed (remainder removing step).

Thereby, the three-dimensional modeled object 10D shown in FIG. 8 and FIG. 9 can be formed.

It is noted that the modification example described in Embodiment 1 is also applicable to Embodiment 4.

[Additional Matters]

A first three-dimensional modeling method according to an embodiment of the present invention is a three-dimensional modeling method of stacking a plurality of sheets to perform three-dimensional modeling, the method including: a fastening step of fastening the stacked sheets 1A to each other; a cutting step of irradiating an upper sheet 1A of the stacked sheets 1A with cutting laser light 51 to cut the upper sheet 1A after the fastening step; and a removing step of removing at least a part of an unnecessary portion 2*b* of the upper sheet 1A cut in the cutting step, wherein in each of the sheets 1A, a body layer 2 to be cut in the cutting step and an adhesive layer 3 formed on at least a partial region of a surface of the body layer 2 and serving for adhesion to another sheet are stacked, and the sheets 1A are fastened to each other by the adhesive layer 3 in the fastening step, and the fastening step and the cutting step are repeated, and the removing step is performed each time the upper sheet 1A is cut in the cutting step to form a three-dimensional structure composed of the plurality of stacked sheets 1A.

According to the above-described configuration, since each sheet 1A is provided with the adhesive layer 3 serving for adhesion to another sheet 1A, the sheets 1A can be fastened to each other using the adhesive layer without the need of performing laser welding as in the related art. Therefore, it is possible to provide a three-dimensional modeling method that achieves a high degree of flexibility in selecting materials without limiting a sheet material (body layer) to metal.

Moreover, according to the above-described configuration, since the removing step is performed each time one sheet 1A is cut in the cutting step, a highly accurate three-dimensional structure can be formed as compared to the mode of stacking the plurality of sheets 1A, and then irradiating the sheets with laser light to cut a sheet laminate at a time.

A second three-dimensional modeling method according to the present invention is a three-dimensional modeling method of stacking a plurality of sheets to perform three-dimensional modeling, the method including: a cutting step of irradiating one sheet 1A with cutting laser light 51 to cut the one sheet 1A; a fastening step of stacking the one sheet 1A cut in the cutting step on another sheet 1A and fastening the sheets 1A to each other; and a removing step of removing at least a part of an unnecessary portion 2*b* of the one sheet 1A after the fastening step, wherein in each of the sheets 1A, a body layer 2 to be cut in the cutting step and an adhesive layer 3 formed on at least a partial region of a surface of the body layer 2 and serving for adhesion to another sheet 1A are stacked, and the sheets 1A are fastened to each other by the adhesive layer 3 in the fastening step, and the cutting step and the fastening step are repeated, and the removing step is performed after each fastening step to form a three-dimensional structure composed of the plurality of stacked sheets 1A.

According to the above-described configuration, since each sheet is provided with the adhesive layer serving for adhesion to another sheet, the sheets can be fastened to each other using the adhesive layer without the need of performing laser welding as in the related art. Therefore, it is possible to provide a three-dimensional modeling method that achieves a high degree of flexibility in selecting materials without limiting a sheet material to metal.

Moreover, according to the above-described configuration, since the removing step is performed each time one sheet 1A is cut in the cutting step, a highly accurate three-dimensional structure can be formed as compared to the mode of stacking the plurality of sheets and then irradiating the sheets with laser light to cut a sheet laminate at a time.

Moreover, in one aspect of the first and second three-dimensional modeling methods according to the present invention, in addition to the above-described configuration, the sheets 1A are caused to adhere to each other by irradiating the adhesive layer 3 with the fastening laser light 41 that is different from the cutting laser light 51 used in the cutting step in wavelength and strength.

According to the above-described configuration, the sheets can be caused to adhere to each other by a simple technique of laser irradiation.

Moreover, since the laser light used for adhesion is different from the laser light used in the cutting step, the sheet is not cut at the time of adhesion.

It is noted that although the sheets 1A are caused to adhere to each other by irradiation of the fastening laser light 41 that is different from the cutting laser light 51 in wavelength and strength in Embodiment 1, wavelength or strength may be made different.

Moreover, in one aspect of the first and second three-dimensional modeling methods according to the present invention, in addition to the above-described configuration, the adhesive layer 3 absorbs the fastening laser light.

According to the above-described configuration, since the fastening laser light is absorbed by the adhesive layer 3, highly accurate three-dimensional modeling can be achieved without irradiating the sheet 1A and the adhesive layer 3 below the adhesive layer 3 with the fastening laser light.

Moreover, in one aspect of the first and second three-dimensional modeling methods according to the present invention, in addition to the above-described configuration, the sheet is irradiated with the laser light at different angles between one cutting step and another cutting step. This enables modeling of various shapes.

Moreover, in one aspect of the first and second three-dimensional modeling methods according to the present invention, in addition to the above-described configuration, in the one cutting step, the sheets 1A, 1B each are irradiated with the laser light at different irradiation angles at least twice.

According to the above-described configuration, cut faces of various shapes, such as a round-cornered cut face, of the body layer of the sheet can be formed by irradiating the sheet with the laser light at different angles in the cutting step.

Moreover, in one aspect of the first and second three-dimensional modeling methods according to the present invention, in addition to the above-described configuration, only a part 2bb of the unnecessary portion 2b of the one sheet 1A is removed in the removing step, and the three-dimensional modeling method further includes: a remainder removing step of removing the remainder 2bbb of the unnecessary portion 2b of the one sheet 1A after fastening another sheet 1A onto the one sheet 1A in the fastening step.

According to the above-described configuration, various three-dimensional structures can be modeled. For example, it is possible to form a three-dimensional modeled object as a hollow structure in which a portion composed of a plurality of stacked sheets is hung from a ceiling of its hollow portion.

The present invention is not limited to the above-described embodiments, and various modifications are possible within the scope of claims. Embodiments obtained by appropriately combining technical units disclosed in different embodiments also fall within the technical scope of the present invention.

The present invention can be applied to a method of forming a three-dimensional modeled object formed of a plurality of stacked sheets.

What is claimed is:

1. A three-dimensional modeling method of stacking a plurality of sheets to perform three-dimensional modeling to form a three-dimensional structure, and the three-dimensional modeling method comprising:
   a fastening step of fastening the stacked sheets to each other;
   a cutting step of irradiating an upper sheet of the stacked sheets with a cutting laser light to cut the upper sheet after the fastening step; and
   a removing step of removing at least a part of an unnecessary portion of the upper sheet cut in the cutting step, wherein
   in each of the sheets, a body layer to be cut in the cutting step and an adhesive layer formed on at least a partial region of a surface of the body layer and serving for adhesion to another sheet are stacked, and the sheets are fastened to each other by the adhesive layer in the fastening step, and
   the fastening step and the cutting step are repeated, and the removing step is performed each time the upper sheet is cut in the cutting step to form the three-dimensional structure composed of the plurality of stacked sheets,
   the sheets are caused to adhere to each other by irradiating the adhesive layer with an adhering laser light,
   the adhering laser light is different from the cutting laser light used in the cutting step in wavelength or strength and passes through a corresponding sheet without cutting the upper sheet and the another sheet.

2. A three-dimensional modeling method of stacking a plurality of sheets to perform three-dimensional modeling to form a three-dimensional structure, and the three-dimensional modeling method comprising:
   a cutting step of irradiating one sheet with a cutting laser light to cut the one sheet;
   a fastening step of stacking the one sheet cut in the cutting step on another sheet and fastening the sheets to each other; and
   a removing step of removing at least a part of an unnecessary portion of the one sheet after the fastening step, wherein
   in each of the sheets, a body layer to be cut in the cutting step and an adhesive layer formed on at least a partial region of a surface of the body layer and serving for adhesion to another sheet are stacked, and the sheets are fastened to each other by the adhesive layer in the fastening step, and
   the cutting step and the fastening step are repeated, and the removing step is performed after each fastening step to form the three-dimensional structure composed of the plurality of stacked sheets,
   the sheets are caused to adhere to each other by irradiating the adhesive layer with an adhering laser light,
   the adhering laser light is different from the cutting laser light used in the cutting step in wavelength or strength and passes through a corresponding sheet without cutting the one sheet and the another sheet.

3. The three-dimensional modeling method according to claim 1, wherein
   the adhesive layer is a layer that absorbs the adhering laser light.

4. The three-dimensional modeling method according to claim 1, wherein
   the sheet is irradiated with the cutting laser light at different angles between one cutting step and another cutting step.

5. The three-dimensional modeling method according to claim 1, wherein
   in the one cutting step, the sheet is irradiated with the cutting laser light at different irradiation angles at least twice.

6. The three-dimensional modeling method according to claim 1, wherein only a part of the unnecessary portion of the one sheet is removed in the removing step, and the three-dimensional modeling method further comprises:

a remainder removing step of removing the remainder of the unnecessary portion of the one sheet after fastening another sheet onto the one sheet in the fastening step.

7. The three-dimensional modeling method according to claim 2, wherein the adhesive layer is a layer that absorbs the adhering laser light.

8. The three-dimensional modeling method according to claim 2, wherein the sheet is irradiated with the cutting laser light at different angles between one cutting step and another cutting step.

9. The three-dimensional modeling method according to claim 2, wherein in the one cutting step, the sheet is irradiated with the cutting laser light at different irradiation angles at least twice.

10. The three-dimensional modeling method according to claim 2, wherein only a part of the unnecessary portion of the one sheet is removed in the removing step, and the three-dimensional modeling method further comprises:

a remainder removing step of removing the remainder of the unnecessary portion of the one sheet after fastening another sheet onto the one sheet in the fastening step.

* * * * *